United States Patent

[11] 3,581,601

| [72] | Inventor | Shin Kitano |
| | | Kariya-shi, Japan |
| [21] | Appl. No. | 821,591 |
| [22] | Filed | May 5, 1969 |
| [45] | Patented | June 1, 1971 |
| [73] | Assignee | Aisin Seiki Company Limited |
| | | Kariya-shi, Japan |
| [32] | Priority | May 6, 1968 |
| [33] | | Japan |
| [31] | | 43/30159 |

[54] SLIP SENSITIVE DIFFERENTIAL GEARING
6 Claims, 9 Drawing Figs.

[52] U.S. Cl. ................................................ 74/711,
64/30
[51] Int. Cl. ................................................ F16d 11/12,
F16h 1/44
[50] Field of Search ................................. 74/710,
710.5, 711; 64/30

[56] References Cited
UNITED STATES PATENTS

| 3,083,658 | 4/1963 | Winberg | 64/30X |
| 3,308,685 | 3/1967 | Wojcikowski | 74/711 |
| 3,319,751 | 5/1967 | Sacchini | 64/30X |
| 3,326,064 | 6/1967 | Ordorica, Jr. | 74/711 |
| 3,396,557 | 8/1968 | Moores, Jr. | 64/30 |

FOREIGN PATENTS

| 996,163 | 6/1965 | Great Britain | 74/711 |

Primary Examiner—Arthur T. McKeon
Attorney—Sughrue, Rothwell, Mion, Zinn & Macpeak ABSTRACT: A limited slip differential mechanism for a motor vehicle, comprising a rotatable casing and a differential gearing, said mechanism being characterized by that the outer clutch plates of clutch means provided for slip limitation are tightly compacted under axial compression by means of a plurality of bolt-and-nut means into a packed assembly together with inner clutch plates of the same clutch means, thereby providing an easy adjustment of preloading pressure for said clutch means without overhaul of the packed clutch assembly and as positioned within the interior space of the differential.

CLUTCH FRICTION RESISTANCE TORQUE CURVES (STATICAL MAXIMA)

DRIVE WHEEL TRACTION TORQUE CURVES

SLIP SENSITIVE DIFFERENTIAL GEARING

This invention relates to improvements in and relating to limited slip differential gearings which are arranged to retard the regular operation of the differential gearing by providing variable friction means.

As is commonly known, the regular differential gearing for automotive use is so designed and arranged that the driving torque transmitted from the propeller shaft is distributed evenly to both wheel drive shafts.

A considerable drawback among these regular differential gearings resides in such that the divided transmitted torque corresponds to that applied to the drive shaft the wheel which is subjected to a lesser road resistance if both wheels are running on an uneven road surface when viewed in the transverse direction of the vehicle. Under these running conditions for the vehicle wheels, the vehicle drive force can be transmitted to the other side vehicle wheel by such amount which corresponds to that of the wheel subjected to the lesser running resistance, even if the other wheel runs on such favorable road surface area capable of providing an acceptable tractional friction. This defective running condition of the powered vehicle is called "spinning" among those who are skilled in the art. Under severe spinning conditions, the vehicle may be unable to continue to run.

Multifriction plate clutch means of the preloaded type have been developed for the obviation of the above kind of conventional drawback. This clutch is arranged between the rotatable casing of the differential and each of the side gears comprised therein. Preloading spring means are provided for each of the clutches so as to maintain the amount of the transmitted torque to respective output—or axle shafts not less than a predetermined value. By the axial movement of each of the side gears upon a lack of wheel traction taking place, the axial thrust caused by the tooth engagement of the side gears and the pinion gears of the differential is added to the preloading thrust for increasing said effect. According to prior art, said preloading spring means are independently mounted relative to the clutch pack in such a way that said spring means does not constitute an intimate member of the pack. Therefore, the pack cannot be inserted in position within the interior of the differential. In special embodiments, said spring means were embodied in the clutch pack, but any adjustment of the preloading pressure could not be performed on the pack once the clutch packs are assembled and inserted into the interior of the differential assembly. Overhauling or otherwise troublesome procedure must be made for performing an after modification or adjustment of the clutch preloading pressure. This kind of necessity for the adjustment of the preloading pressure must be made rather frequently on account of the unavoidable, even minor dimensional irregularity of the constituent parts, especially the thickness of each of the clutch plates; the distance of the rotatable casing wall and each of the side gears in which a clutch pack should be exactly positioned. In these cases, considerable difficulty was met for performing the after adjustment of the preloading forces in a precise, yet easy and quicker way.

Still further difficulty was encountered with occasional disengagement of the side gears from the meshing pinion gears in the differential to be caused frequently by the necessary axial sliding movement of the former for the compensation of a lack of wheel traction. This kind of conventional drawback was met frequently, especially when the torque to be transmitted is high. For attaining and keeping the desired optimum interengagement of side gear and pinion gear, adjustment of the axial thrust must be frequently made. According to the prior art, the procedure was made only with difficulty.

In order to solve out the aforementioned conventional drawbacks, it is the main object of the present invention to provide a limited slip differential mechanism which is capable of adjusting the preloading conditions of the clutch means as assembled and positioned in the differential in an easy and most convenient way.

A further object is to provide a differential of the above kind capable of adopting any selected value of spring preloading so as to adapt it most suitably to occasional demands.

It is a still further object of the present invention to provide a limited slip differential mechanism of the above kind, capable of positioning side gears of the differential gearing completely independent of the frictional resistance in the clutch means.

These and further objects, features and advantages of the invention will become more apparent when read the following detailed description of the invention by reference of the several accompanying drawings illustrative of three preferred embodiments of the invention by way of examples. The drawings constitute a part of the present invention.

Figure 1:
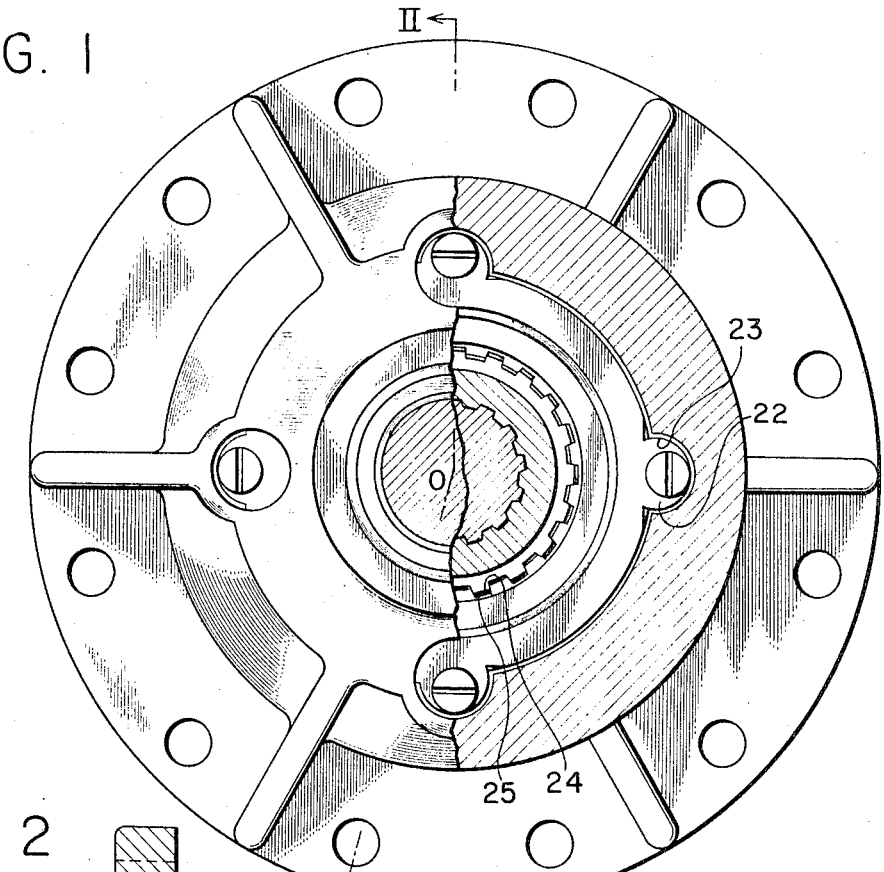
FIG. 1 is a half-sectional front view of the first embodiment of the invention.
Figure 2:
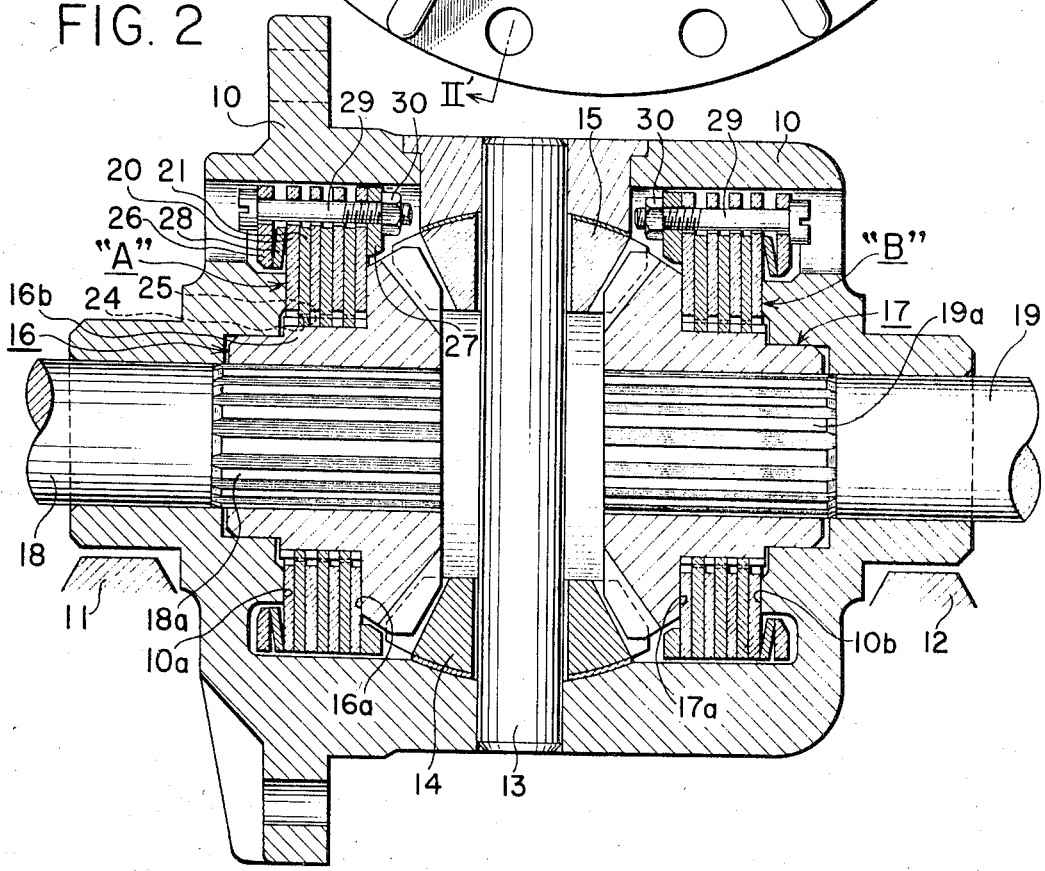
FIG. 2 is an axial sectional view of the differential mechanism shown in FIG. 1, the section being substantially taken along a section line II–O–II' shown therein.

Referring now to the accompanying drawings, especially to FIGS. 1 and 2, the first embodiment of the invention will be described in detail.

In the first embodiment shown, the numeral 10 represents a conventional rotatable housing mounted on bearings 11 and 12 which are shown only schematically. This housing 10 is driven through a conventional bevel gearing, not shown, from an automotive propeller shaft, again not shown. In the housing 10, there is provided a pinion shaft 13 arranged to rotate in unison therewith, said shaft mounting rotatably a pair of planetary bevel pinions 14 and 15. These pinions are arranged opposite to each other along the shaft 13 and kept in permanent engagement with bevel gears 16 and 17. These side gears are mounted on respective splined inner ends 18a and 19a of a pair of outwardly and oppositely extending output shafts 18 and 19 which mount fixedly respective vehicle wheels at their outer ends, although not shown. From the foregoing, it will be clear that the side gears 16 and 17 are slidable to a certain degree along the common axial direction of the output shafts.

Figure 6:
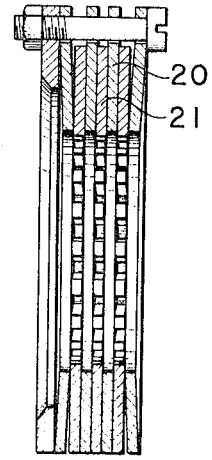
FIG. 6 is a longitudinal sectional view of a clutch pack representing a slight modification from that shown in FIGS. 1 and 2.
Figure 7:
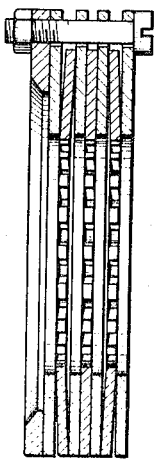
FIG. 7 is a similar view to FIG. 6, showing a still further modified clutch pack unit.

Side gears 16 and 17 are formed with abutting ring surfaces 16a and 17a, respectively and the housing 10 is formed with oppositely arranged abutting surfaces 10a and 10b. Clutch unit assemblies "A" and "B" embodying the main feature of the invention are inserted between opposing surfaces 10a and 16a, and 10b and 17a, respectively. Since these clutch unit assemblies are of same design, only one of the both at "A" (see also FIG. 6) will be described in the following.

The clutch unit "A" comprises outer clutch plates 20 and inner clutch plates 21, former plates 20 being formed with a plurality of radially extending outer projections 22 (see FIG. 1) which are kept in driving engagement with respective grooves 23 formed in the inside wall surface of said housing 10. Therefore, it will be clearly seen that outer clutch plates 20 rotate in unison with the rotatable housing 10.

Inner clutch plates 21 are formed with axially extending inside grooves 24 which are kept in meshing with spline teeth 25 formed on the outside peripheral surface of the boss at 16b of side gear 16. Therefore, with rotation of side gear 16, said inner clutch plates 21 will rotate in unison therewith. Outer and inner clutch plates are arranged axially in an alternating way as shown and packaged by means of a pair of end pressure plates 26 and 27. Between the left-hand extreme outer clutch plate 20 and end plate 26, a resilient spring plate formed into a ring 28 is inserted.

The thus provided whole clutch plate assembly "A" including said end plates and spring plate is packaged under pressure by means of a plurality of fixing bolts 29 passing through respective radial projections 22 by tightening respective nuts 30. For this purpose, each of these nuts may be formed with manipulating radial holes into which a manipulating pin are to be inserted for turning these nuts separately. Therefore, the outer and inner clutch plates may be brought into and kept in a predetermined pressure engagement one after another.

The operation of the first embodiment so far shown and described is as follows:

When the vehicle is stationary, there is substantially no axial pressure among housing 10, clutch unit "A" and side gear 16.

On the contrary, when the vehicle runs, motion is transmitted through the conventional bevel gearing to the housing 10, accompanying the pinion shaft 13. Therefore, planetary pinions 14 and 15 kept in meshing with side gears 16 and 17 revolve about the common axis of output shafts 18 and 19. By virtue of this meshing, the side gears revolve about said common axis and in addition, these gears are subjected to outwardly opposite axial thrusts, thereby the clutch units "A" and "B" being urged to move outwardly against respective inside wall surfaces 10a and 10b of the now rotating housing 10 with equal axial thrusts, if the vehicle is running along a straight line course and on a substantially even road surface providing equal frictional resistances to the respective vehicle wheels under consideration or rear wheels.

Under these operating conditions, the driving torque transmitted from the vehicle propeller shaft (not shown) through bevel gearing (not shown) to the casing 10, thence through pinion shaft 13 and planetary pinions 14 and 15 to the side gears 16 and 17, respectively. Thanks to the provision of spline connections at 18a and 19a, the driving torque will be transmitted to the respective axle or output shafts 18 and 19, thence to the respective drive wheels, not shown. In this case, planetary pinions rotate only about their own axes, but not around the common shaft axis passing longitudinally through the output shafts. By the gear meshing between pinions 14, 15 and side gears 16, 17, the latter gears will urged to move outwardly and axially, as was briefly referred to hereinabove. But, there is practically no rotational speed difference between the driving parts and the driven parts of the differential at this operational stage, clutch units "A" and "B" can not operate in any way, thus no alteration being invited in the wheel traction force.

When either of said drive wheels should fail to have traction on account of unfavorable ground conditions, there will appear a considerable difference between the rotational speeds of the side gears and the latter will slide a certain distance along and on the respective splined shaft ends 18a and 19a. Therefore, additional and outwardly directing axial thrusts are applied to the clutch packs "A" and "B," respectively, so that a combined, rather intensified clutch energizing forces are applied to the clutch packs. The planetary pinions rotate in this case about the respective output shafts, in addition to their own rotational movement around their axes. Casing 10 rotates in unison with the outer clutch plates of both clutch packs "A" and "B," while side gears 16, 17 rotate in unison with inner clutch plates. Therefore, side gears 16, 17 are further moved outwardly and axially, and clutch packs "A" and "B" will be additionally energized by the axial thrusts provided by the now outwardly sliding side gears. The driving torque is transmitted from the driving parts to the driven parts of the differential through the intermediary of said clutch packs. Therefore, the otherwise lost wheel traction will be recovered. When the remaining drive wheel should fail to have traction, a similar driving operation through the clutch means will be realized.

As seen, the packs are compacted into respective tight and smart packed assemblies which can be inserted in position or taken out from the interior space of the differential. In addition, the preloading pressure can also be easily modified by tightening the lock nut means without overhaul of the clutch parts and from outside of the differential gear casing. Any desired alteration and adjustment of the preloading force of said gear packs can easily made from outside of the gear casing.

Although in the following, second and third embodiments of the invention are to be described in detail, it should be however stressly noted that same or similar parts as before are denoted substantially with same reference symbols for easy and convenient comparison and for rather better understanding the nature and advantages of the present invention.

Figure 3:
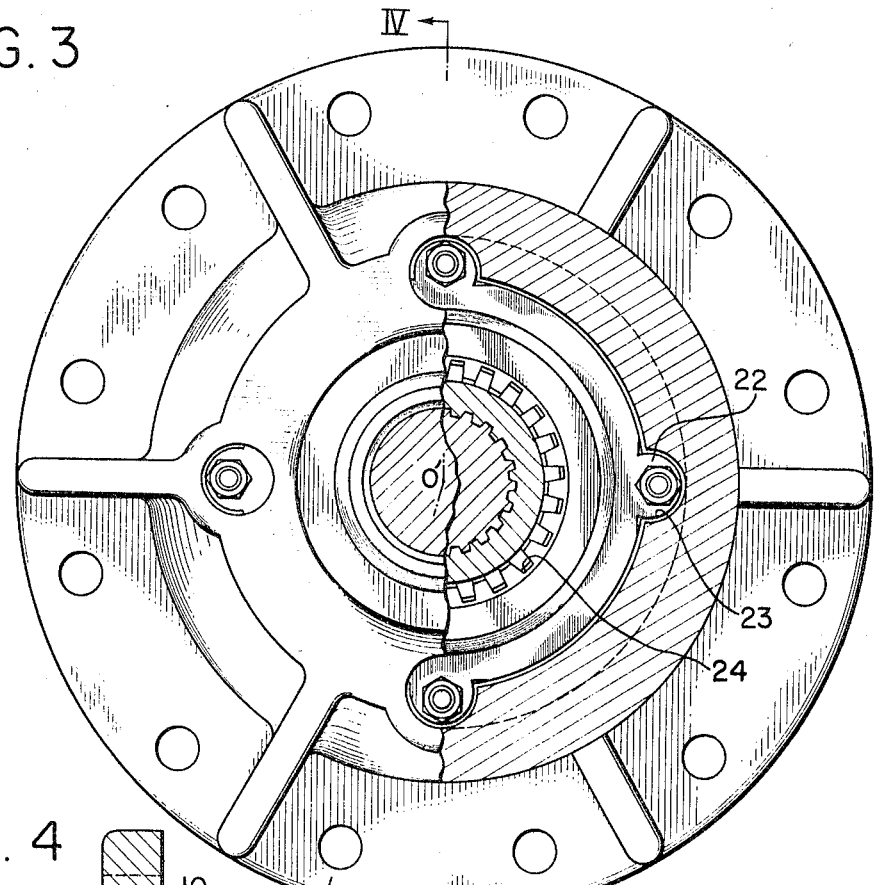
FIG. 3 is a similar view to FIG. 1, illustrating a preferred second embodiment of the invention.
Figure 4:
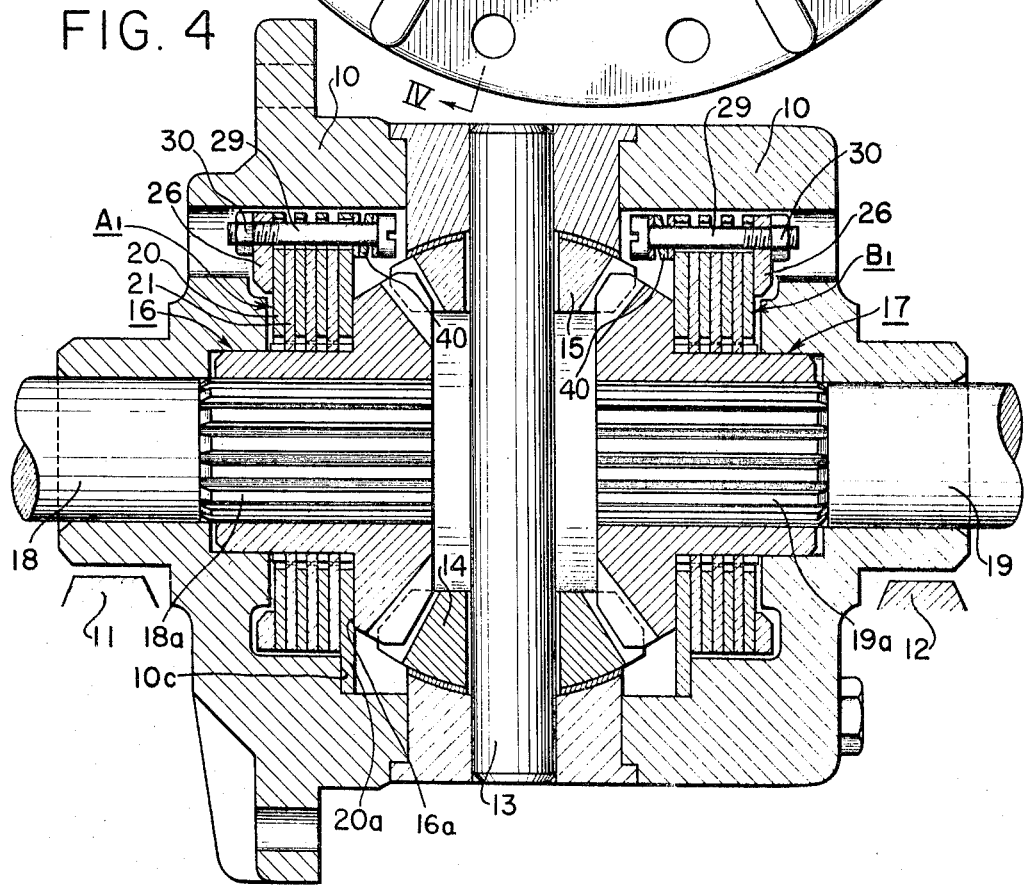
FIG. 4 is a similar view to FIG. 2, the section being taken along the section line IV–O'–IV shown in FIG. 3.

Next, referring to FIGS. 3 and 4, the second embodiment of the invention will be described in detail.

In this second embodiment, various components are designed and arranged in such a way that the thrusts provided by the side gears 16 and 17 act no influence upon the frictional resistance in the clutch units at $A_1$ and $A_2$ which are somewhat modified from those denoted "A" and "B" in the foregoing embodiment. The clutch unit $A_1$ comprises each plurality of outer clutch plates 20, 20a and inner clutch plates 21 arranged in an alternating way with each other. Outer clutch plates 20, 20a are formed with radially extending projections 22 which are received in respective grooves 23 formed on the inside wall of the casing 10 as before, for attaining a unitary rotation of the clutch plates with the casing. Innermost outer clutch plate 20a abuts against an abutting surface 10c formed on the inside wall of the casing 10, on the one hand, and against the abutting ring surface 16a formed on side gear 16. Even with an axially outward movement of side gear 16, the thus created thrust force is checked by the innermost clutch plate 20a abutting against the abutting surface 10c. Therefore, it will be seen from the foregoing that the frictional clutch resistance at $A_1$ is not altered in any way by the axial movement of the clutch unit. In the similar manner to that shown at "A" in the foregoing embodiment, the assembly of outer and inner clutch plates is packed together by means of end pressure plates 26, 27 and fixing bolts 29 fitted with nuts 30. In the present embodiment, however, spring plate 28 employed in the first embodiment has been replaced by a coil spring 40 which is provided between the head of bolt 29 and the inner end pressure plate 27. The opposite clutch unit $B_1$ has a similar design and arrangement with that of the foregoing unit $A_1$; and thus no further analysis would be necessary for better understanding.

It should be noted that the design and construction of the opposite clutch unit $B_1$ are same as those of the left-hand unit $A_1$, yet being arranged in symmetrical arrangement to the latter about the pinion shaft 13.

The operation of this second embodiment is as follows:

When the vehicle runs along a straight course on an even road surface, the clutch units $A_1$ and $B_1$ will affect upon the vehicle traction as in the case of the first embodiment.

On the contrary, when either drive wheel should perform a slip, there will appear a remarkable difference between the rotational speeds of side gears 16 and 17, yet providing no vehicle traction force. In this case, the side gear, for instance, at 16 which relates to the driving wheel having no traction such as the left-hand drive wheel rotates around the opposite side gear 17, which relates to the remaining drive wheel now being assumed as having traction, through the intermediary of planetary pinions 14 and 15. Naturally, in this case, clutch units $A_1$ and $B_1$ are brought into operation. The casing 10 rotates in unison with outer clutch plates 20, 20a, while inner clutch plates 21 will rotate in unison with side gear 16 or 17. By the provision of coil springs 40 for preloading the clutch means, the driving force transmitted through the rotating casing 10 will be dividedly distributed to both side gears 16 and 17. In this case, side gears 16 and 17 have a tendency for sliding outwardly in the opposite axial directions along respective output shafts 18 and 19 and for increasing the clutch disc pressure, yet in practice, the clutch frictional resistance will not increase with increase of the wheel traction.

By the arrangement of the side clutches in the aforementioned way so as to be independent of the clutch loading, otherwise adverse effect of the clutch frictional resistance upon the regular running performance of the vehicle which is fitted with the differential according to this invention can be suppressed to a possible minimum. In addition, a proper and permanent engagement of side gear teeth with those of planetary pinion gears will be assured in an optimum manner.

Figure 5:
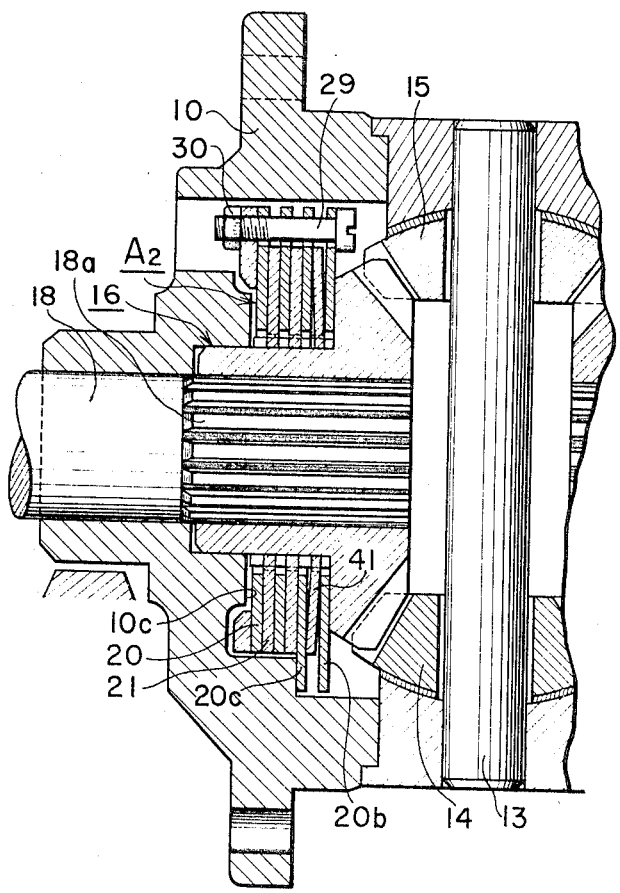
FIG. 5 is a similar view to FIG. 2, yet being shown only about a half and illustrating a preferred third embodiment of the invention.

In the differential as the third embodiment of the invention shown in FIG. 5, each of clutch units $A_2$ and $B_2$ ($B_2$ being not shown) comprises again each plurality of outer clutch plates or discs 20, 20c, 20b and of inner clutch plates 21 arranged substantially in an alternating way as before. The outer clutch plates are formed with radially extending projections as before, although not shown, which are received in respective axial grooves, not shown, formed on the inside wall of casing 10. Thus, the clutch pack means are capable of rotating in unison with casing 10. Between plates 20c and 20b, there is provided a centrally perforated spring dish 41 for preloading the clutch pack. The innermost clutch plate 20b serves for transmitting occasional thrust caused by the occasional axial sliding movement of side gear 16 because of a lack of traction of either drive wheel with the ground, to the neighboring plate 20c through spring dish 41, said thrust being checked by the tight engagement of the plate 20c against the abutting surface 10c acting as thrust stop. In this case, the remaining outer and inner clutch plates are kept in pressure engagement one after another, yet with a correspondingly reduced thrust force.

Other constructional features of the present embodiment are substantially similar to those of the first embodiment: Outer clutch plates 20, 20c, 20b and inner clutch plates 21 are packed together by means of fixing bolts 29 with respective nuts 30, said bolts passing through respective radial projections 22 which are received axial grooves 23 as before, although not shown. It will be apparent that in the present embodiment the preloading pressure can be easily adjusted with the clutch means fitted in position within the rotatable casing of the differential. This feature is naturally applicable to the foregoing two embodiments.

The operation of the third embodiment is as follows:

When either drive wheel losts traction, a correspondingly substantial difference will appear in the rotational speeds of side gears 16 and 17, yet no traction will be invited. In this case, clutch packs $A_2$ and $B_2$ ($B_2$ being not shown) are brought into operation. Thus, casing 10 will rotate in unison with outer clutch plates 20, 20c, 20b, while inner clutch plates rotate in unison with either side gear 16 or 17 (17 being not shown). By the provision of dish spring 41, clutch plates are energized by axial pressure causing mutual friction, and the driving force transmitted from the rotating casing 10 is dividedly distributed through the clutch means to the side gears 16 and 17. With outwardly axial sliding movement of these side gears, the spring dish is further compressed. But, this increased compression or axial thrust will be checked by the stop surface 10c as before. Therefore, the frictional force induced in the clutch means at this operational stage will become smaller than that which developed before the axial sliding of the side gears. Thus, the clutch frictional resistance torque will be reduced with increase of wheel traction force. This means is predominantly effective for obviating otherwise appearing adverse effect caused by clutch frictional resistance during a regular running of the vehicle with its both drive wheels having ample traction.

Figure 8:
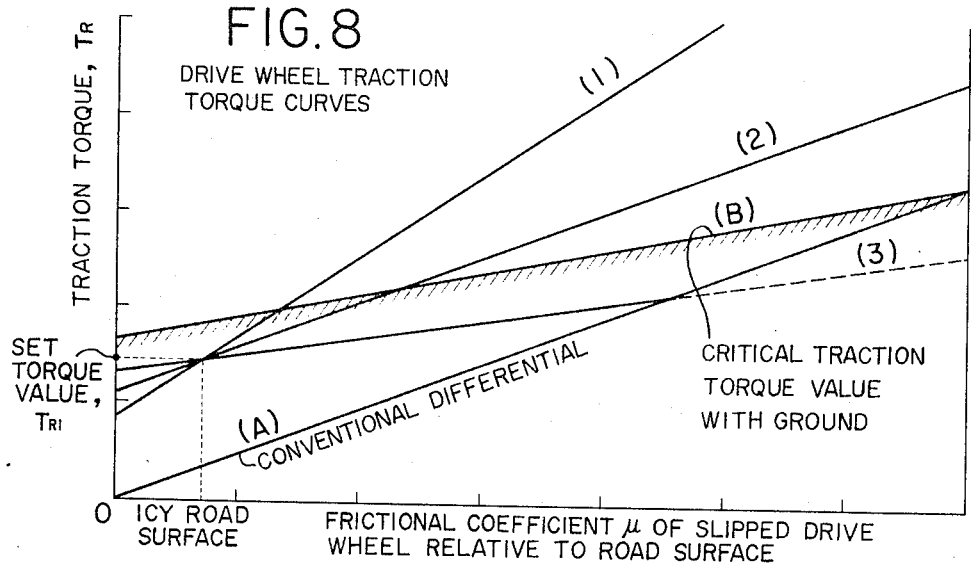
FIG. 8 is a diagrammatic view of several performance curves of the embodiments of the invention in comparison with that of a conventional comparative mechanism.

Lastly referring to FIG. 8 which illustrates several performance curve of the clutch means employed in the foregoing three embodiments of the invention, a representative drive wheel traction torque curve of a conventional differential is shown at (A), while curve (1) shows that of the first embodiment.

Curves (2) and (3) show respective performance curves of the second and third embodiments. In these experiments, one drive wheel was placed on a asphalt road surface and the curve shows the maximum value of traction force with variation of frictional coefficient of the slipping drive wheel relative to various road surface conditions. Traction torque values of the differentials at (1), (2) and (3) were obtained when the traction lost drive wheel is placed on icy ground and a mean or established torque thereon is assumed to be $T_{R1}$ as shown. The curve (B) denoted "Critical Traction Torque Value" shows the maximum attainable torque capable of being transmitted with frictional resistance acting between wheel and ground, yet without wheel slippage. With higher torque values above this curve (B), both drive wheels will loss traction and therefore these values are not necessary to consider.

Prior to preloaded differentials are known to represent performance curves similar to those shown at (1), (2) and (3) in FIG. 8. It is generally recommendable to attain the performance curve (B) or nearly so, but in practice, occasion may desire to employ different operational curves than that at (B). According to this invention, highly suitable clutch packs are provided which are applicable to any one of the differentials showing either of said performance curves (1), (2) or (3) can be obtained.

Figure 9:
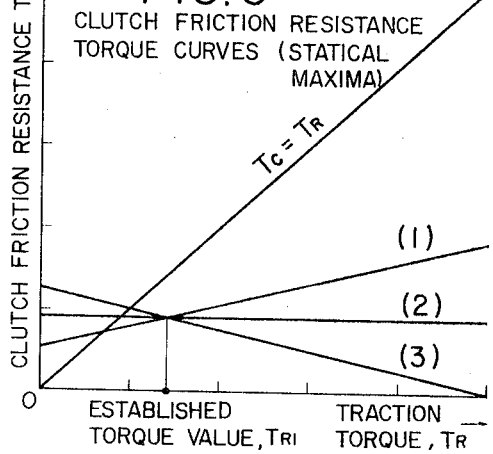
FIG. 9 is a further explanatory diagram showing clutch friction resistance torque curves in the case of the three embodiments of the invention.

In FIG. 9, clutch friction resistance: $T_C$ has been plotted against traction torque $T_R$ for several differentials which represent respectively torque performance curves (1), (2) and (3) shown in FIG. 8. With the differential corresponding to said curve (1), FIG. 9, the friction resistance of the clutch means gradually increases with increase in the axial sliding movement of side gears because of the increase of the clutch energizing force. In the case of the curve (2), FIG. 9, the axial movement of side gears does not influence upon the clutch energizing force. On the other hand, certain clutch plates are subjected to reduced frictional resistance with axial advance of the side gears in the case of curve (3). By making the clutch frictional resistance to be smaller with increase of the axial sliding movement of side gears, otherwise excessive wear of the clutch plates can be avoided, thereby increasing the durable life of the clutch means. In addition, otherwise adverse effects which may be encountered, especially during vehicle turning, upon the steering performance thereof can be minimized.

When repeated lastly, the differential according to this invention can provide an easy and accurate adjustment of the preloading spring pressure of clutch means as fitted therein, and indeed, from outside of the differential and without overhauling of the clutch means.

I claim:

1. In a limited slip differential mechanism for a motor vehicle, said differential mechanism comprising a rotatable housing, means for drivingly connecting said rotatable housing to a vehicle drive shaft, a differential gearing assembly located in said housing, said differential gearing assembly including at least two planetary pinions located opposite each other within said rotatable housing and operatively connected thereto, two side gears located within said rotating housing in mesh with said planetary pinions, said side gears having their axis of rotation corresponding to the axis of rotation of said housing and perpendicular to the axis of rotation of said planetary pinions, two rotatable output shafts having one end thereof connected to each of said two side gears and their other ends drivingly connected to vehicle drive wheels, a clutch assembly slidably mounted along a common axis along said output shafts and located between each side gear and the end of said rotatable housing adjacent thereto, said clutch assembly comprising, a plurality of outer clutch plates and inner clutch plates, said outer and inner clutch plates arranged in an alternating manner between said end wall of said rotatable housing and said side gear, said outer clutch plates having a plurality of radially outwardly extending projections engaging respective grooves in the interior of said rotatable housing, said inner clutch plates having a splined connection with the exterior surface of an axially extending portion of said side gears, wherein the improvement comprises, a plurality of openings in each end of said rotatable housing corresponding to the grooves therein, adjustable clamping means connected to said clutch assembly independently of said rotatable housing and located at each opening in the ends of said rotatable housing for clamping the clutch plates of each clutch assembly together, and biasing means positioned between said clamping means and said clutch plates independent of said rotatable housing for placing said clutch plates under predetermined axial compression, whereby said adjustable clamping means may be adjusted through the openings in the ends of said rotatable housing for changing the preload axial pressure on said clutch plates without requiring disassembly of said differential mechanism.

2. The improvement in a limited slip differential mechanism as claimed in claim 1, wherein said adjustable clamping means comprises a plurality of threaded bolts extending through said radially outwardly extending projections of said outer clutch plates and having a threaded member located thereon, whereby said axial preload on said clutch plates may be adjusted by rotating said bolts through said openings in the ends of said rotatable housing.

3. The improvement in a limited slip differential mechanism as claimed in claim 2, wherein said biasing means comprises a coil spring located on said bolts between the head thereof and one of said outer clutch plates.

4. The improvement in a limited slip differential mechanisms as claimed in claim 1 wherein said biasing means comprises a dished washer spring positioned between said clutch plates and said clamping means.

5. The improvement in a limited slip differential mechanism as claimed in claim 4, wherein said dished washer spring is positioned between said outer clutch plate located adjacent to said side gear and the next adjacent outer clutch plate, the side of said radially outwardly extending projections of said next adjacent outer clutch plate which is opposite the side of said clutch plate adjacent said dished washer is in engagement with an abutting surface formed on the inside of said rotatable housing, whereby, when said side gears are moved axially outwardly by the reaction forces in said differential unit, said side gears are forced against said adjacent outer clutch plate to reduce the preload force on said clutch assembly.

6. The improvement in a limited slip differential mechanism as claimed in claim 1, wherein an outer clutch plate located in said clutch assembly adjacent said side gear has one side surface in abutting relationship with an adjacent side surface of said side gear and its opposite side in engagement with an abutting surface formed on the interior of said rotatable housing, whereby, when said side gears are moved axially outwardly by the reaction forces of the differential assembly, no additional axial compression force is transmitted to said clutch assembly.